2,781,290

THERAPEUTIC CATION EXCHANGE RESIN COMPOSITION

Gustav J. Martin, Ambler, and Miller J. Sullivan, Philadelphia, Pa., assignors to The National Drug Company, Philadelphia, Pa., a corporation of Delaware No Drawing. Application October 2, 1952, Serial No. 312,859

6 Claims. (Cl. 167—55)

This invention relates to compositions for use in human therapy, and more particularly to novel resinous compositions especially useful in cation exchange therapy.

Generally, the basic goal of cation exchange therapy is the removal of sodium. When resins are administered they remove not only sodium but the other cations, and the selectivity is higher for those ions with the higher valences. Naturally if the resin has combined with the higher valence cations, it cannot combine with the lower valence forms, of which sodium is the key. Consequently, for any satisfactory result it is necessary to use an inordinately high quantity of the resin. This increases the cost of such therapy and is also a great inconvenience to patients who are called upon to ingest an uncomfortably large quantity of any dosage form.

Novel compositions have now been found which overcome the above and other disadvantages of present therapeutic agents in this vital field. These compositions broadly comprise cation exchange resins and chelating agents, especially of the polyamine, polyacid type. These compositions are prepared by first combining the desired resin with the chelating agent in a suitable dosage form, and thereafter administering the dosage to the patient. It is a surprising fact, but true, that the chelating agent content of the new compositions selectively combines with polyvalent cations, e. g. calcium, magnesium and the like, which are normally present in the body, thereby freeing the cationic resin for reaction specifically with sodium, as desired. The metal chelate complex prevents the metallic units from functioning as ions, hence they do not compete with sodium for the cation exchange material. Despite the innumerable complications occasioned by the many possible body conditions, the new products function most efficiently in this way in vivo, and the capacity of the resin for sodium is elevated by as much as 50% or more.

The cation exchange resins which are of such peculiar value is conjunction with chelating agents may be of either the carboxylic, sulfonic or phosphonic acid types. Resins of this nature are described in the book "Ion-Exchange Resins" by Kunin and Meyers and in various journal articles, such as McChesney and McAuliff, Am. J. Physiology 160, 264–276 (1950), and Chen and Freeman, J. Lab. Clin. Med. 35, 99–109 (1950). Examples are the resins which are polymers of aromatic acid hydrocarbons like phenol-sulfonic acid or benzoic acid, linked and cross-linked by stable carbon chains contributed by the condensing agent, usually formaldehyde or other short (e. g. 1 to 4 C)—chain aliphatic couplers, and having chemical groups such as sulfonic, carboxylic, phosphonic or phenolic radicals attached to the benzene ring. The carboxylic resins are particularly useful and preferred by reason of their relative cheapness and availability. Specifically, resins commercially available under the name "Natrinil" are especially valuable. These are polystyrene resins cross-linked by divinyl benzene chains, wherein the divinyl benzene content is at least 2% or (usually) more, and having carboxylic radicals attached to benzene rings. Such resins can be in various cycles, but the preferred form is up to 30% by weight in the potassium cycle and at least 70% in the hydrogen or ammonium cycles.

As previously mentioned, useful chelating agents are generally those of the polyamine, polyacid type. Several examples of such compounds are ethylenediamine tetra-acetic acid, triglycin and methyl amino-diacetic acid, O-diamine-cyclohexane tetra-acetic acid, etc. Particularly successful results are achieved with ethylenediamine tetra-acetic acid.

Depending upon the particular therapy desired, the patient to be treated and the type of resin and chelating agent chosen, the ratio of the resin content to the chelator content in the new compositions may vary widely. A minimum of experimentation will give the best range for a certain situation. It is generally preferred, for instance, in the case of ethylenediamine tetra-acetic acid to employ one part by weight of this chelator to substantially between one and ten parts of resin, especially a carboxylic type resin.

The new products are generally administered in relatively pure form, but they may be combined with inert diluents, such as starch, sugars, various stearates and carbonates, kaolin or talc, to provide tablets, gelatin capsules and the like. Other useful dosage forms are liquid suspensions or solutions, particularly aqueous suspensions for oral administration.

The resin should be in extremely finely divided form, i. e. substantially all of the particles thereof should pass through a 100 mesh screen, U. S. sieve series. On this scale set up by the U. S. Bureau of Standards a 100 mesh screen has a clear opening of 0.149 mm. in width. If the resin particles are larger than 100 mesh, the larger particles appear to irritate the tender surfaces of the gastrointestinal tract. Further, for larger particles increased dosages are required to obtain the same effect, probably due to the decreased surface area available for the exchange reaction. The greater bulk of such increased dosages, as well as the frequently gritty nature of larger particles, often nauseates the patient and is anyway most unpalatable. The resin should also be predominantly in the free hydrogen or ammonium forms, although it may contain 20–30%, but preferably only up to 25%, of the potassium form. Finally, the resin should naturally be capable of being wetted by the aqueous media.

The following example is given by way of illustration only and is not to be considered as the sole embodiment of this invention. It is to be understood that protection hereof is only to be limited by the specific wording of the appended claims.

*Example*

Fifty rats were fed a standard diet containing 10% by weight of a "Natrinil" carboxylic cation exchange resin. The sodium content of the feces increased by 440 mg. per rat over a period of twenty days, as compared with control rats fed exactly the same diet without a cation exchange resin.

Fifty similar rats were fed the same diet with the addition of a composition of ten parts by weight of the same cation exchange resin in combination with one part by weight of ethylenediamine tetra-acetic acid. This composition provided 10% by weight of the total diet, as with the previous rats. The increased fecal excretion of sodium was 1002 mg. per rat for the twenty day period, showing an improvement factor of more than 2.

What is claimed is:

1. A therapeutically active cation exchange resin composition comprising a cation exchange resin containing free acid groups and a polyamine, polyacid chelating compound.

2. A therapeutically active cation exchange resin composition comprising a carboxylic acid-type cation exchange resin and an alkylene polyamine polyacid.

3. A composition according to claim 2 wherein the alkylene polyacid is ethylenediamine tetra-acetic acid.

4. A therapeutically active cation exchange resin composition particularly adapted for the selective removal of sodium in vivo, comprising an alkylene polyamine polyacid and a solid, finely divided, water-wettable cation exchange resin which is a polymer of aromatic acids with short carbon chain cross-linkages.

5. A composition according to claim 4 containing one part by weight of the polyacid to substantially between one and ten parts by weight of the resin.

6. A therapeutically active cation exchange resin composition particularly adapted for the selective removal of sodium in vivo, comprising a solid, finely divided carboxylic acid-type polystyrene resin, cross-linked by at least 2% by weight of divinyl benzene, and ethylenediamine tetra-acetic acid.

References Cited in the file of this patent

FOREIGN PATENTS 262,670   Switzerland _____ Oct. 1, 1949

OTHER REFERENCES

Hilfer: Drug and Cosmetic Industry, January 1949, pp. 40, 41, 121.

McChesney: Am. J. Physiology, vol. (60), pages 264 to 276 (1950).